(12) United States Patent
Reinhold et al.

(10) Patent No.: US 10,688,689 B2
(45) Date of Patent: Jun. 23, 2020

(54) APPARATUS FOR PRODUCING PREFORMS

(71) Applicant: Broetje-Automation GmbH, Rastede (DE)

(72) Inventors: Raphael Reinhold, Wittmund (DE); Lars Meyer, Rastede (DE)

(73) Assignee: Broetje-Automation GmbH, Rastede (DE)

( * ) Notice: Subject to any disclaimer, the term of this patent is extended or adjusted under 35 U.S.C. 154(b) by 247 days.

(21) Appl. No.: 15/123,759

(22) PCT Filed: Mar. 6, 2015

(86) PCT No.: PCT/EP2015/054695
§ 371 (c)(1),
(2) Date: Sep. 6, 2016

(87) PCT Pub. No.: WO2015/132371
PCT Pub. Date: Sep. 11, 2015

(65) Prior Publication Data
US 2017/0015020 A1    Jan. 19, 2017

(30) Foreign Application Priority Data
Mar. 6, 2014   (DE) .......................... 10 2014 002 950

(51) Int. Cl.
*B29B 11/16*   (2006.01)
*B29L 31/00*   (2006.01)
*B29K 105/08*  (2006.01)

(52) U.S. Cl.
CPC ...... *B29B 11/16* (2013.01); *B29K 2105/0809* (2013.01); *B29L 2031/003* (2013.01)

(58) Field of Classification Search
CPC ....................................................... B29B 11/16
See application file for complete search history.

(56) References Cited

U.S. PATENT DOCUMENTS

| 5,766,541 A | 6/1998 | Knutsson et al. |
| 2009/0065977 A1 | 3/2009 | Suzuki et al. |

(Continued)

FOREIGN PATENT DOCUMENTS

| DE | 4017978 | 12/1991 |
| DE | 102008011410 | 9/2009 |

(Continued)

OTHER PUBLICATIONS

"International Search Report and Written Opinion," for PCT/EP2015/054695, dated May 29, 2015 (9 pages), English translation.

(Continued)

*Primary Examiner* — Ryan M Ochylski
(74) *Attorney, Agent, or Firm* — Pauly, DeVries Smith & Deffner LLC (57) ABSTRACT

The disclosure relates to an apparatus for the production of parisons from fiber-reinforced plastic, having a feed arrangement for the continuous feed of a laid fiber fabric and having a transverse deformation arrangement with a draping apparatus for the deformation of the fed laid fiber fabric to form a predefined nominal profile. The apparatus is distinguished by the fact that the draping apparatus is adjustable for a variation of a cross section of the nominal profile. The disclosure also relates to a corresponding method for the production of parisons from fiber-reinforced plastic.

17 Claims, 5 Drawing Sheets

(56) References Cited

U.S. PATENT DOCUMENTS

2011/0285055 A1    11/2011    Reinhold et al.
2012/0328846 A1*  12/2012    Blot ........................ B29B 11/16
                                                                         428/175

FOREIGN PATENT DOCUMENTS

| DE | 102010014704 | 10/2011 |
|----|--------------|---------|
| DE | 102010043666 | 5/2012 |
| DE | 102011002906 | 7/2012 |
| DE | 102011052951 | 2/2013 |
| DE | 102012206020 | 10/2013 |
| EP | 2374607 | 10/2011 |
| EP | 2722145 | 4/2014 |
| WO | 2010007417 | 1/2010 |
| WO | 2011039484 | 4/2011 |

OTHER PUBLICATIONS

"Search Report," for German Patent Application No. 102014002950.6, dated Oct. 9, 2014 (5 pages), no translation available.
Office Action for Chinese Patent Application No. 201580021717, dated May 4, 2018 (9 pages), no translation available.
Office Action for Russian Patent Application No. 2016139095, dated Apr. 3, 2018 (4 pages), no translation available.

* cited by examiner

APPARATUS FOR PRODUCING PREFORMS

CROSS-REFERENCE TO RELATED APPLICATIONS

This application is a national stage application under 35 U.S.C. 371 of Inter-national Patent Application Serial No. PCT/EP2015/054695, entitled "Vorrichtung zur Herstellung von Vorformlingen," filed Mar. 6, 2015, which claims priority from German Patent Application No. DE 10 2014 002 950.6, filed Mar. 6, 2014, the disclosures of which are incorporated herein by reference.

FIELD OF THE TECHNOLOGY

The document relates to an apparatus for the production of preforms from fiber-reinforced plastic and to a method for the production of preforms from fiber-reinforced plastic.

BACKGROUND

Fiber-reinforced plastics, which include primarily fiber-reinforced polymers, glass-fiber-reinforced plastics (GFRP) and carbon-fiber-reinforced plastics (CFRP), are becoming ever more important as replacements for conventional structural materials composed of metals such as steel or aluminum. Here, fiber-reinforced plastics offer good strength and rigidity with a simultaneously low weight. The use thereof is thus of particular interest in the automotive sector, in wind turbines and in particular in aeronautical engineering, where it is for example possible for profiles composed of fiber-reinforced plastic to be used as ribs in passenger aircraft.

The production of such profiles constitutes a challenge, in particular in the case of relatively complex geometries such as are often required in aeronautical engineering. In the case of a high level of geometric complexity, manufacturing is performed substantially manually, which entails high outlay.

There are however also approaches for automated production of profiles from fiber-reinforced plastic. Here, in general, an apparatus for the automated production of preforms is tailored specifically to a certain geometry of the profile. It is thus conventional, in the case of a desired longitudinal curvature of the profile, for all processing steps to be configured for that radius of curvature. Highly cumbersome conversion is then necessary for the production of a profile with a different radius of curvature.

The prior art, and specifically DE 10 2010 014 704 A1, from which the present disclosure proceeds, has disclosed an apparatus for the continuous production of preforms from fiber-reinforced plastic. Here, an individual profile—the preform, which may also be referred to as sub-preform—is produced by deformation from a coiled semifinished part, which individual profile is fixed by way of the heating of a binding agent. Here, the binding agent may basically already be present in the semifinished part—such a semifinished part is then referred to as a prepreg—or may be applied to the semifinished part within the apparatus. Several such individual profiles may then be assembled to form an overall profile, which is also referred to as final preform.

The apparatus known from the prior art separates the step of transverse deformation from that of longitudinal deformation. In this way, an adaptation of the radius of the longitudinal deformation is possible which does not necessitate conversion of the prior processing steps.

A disadvantage of an apparatus of said type is however that the increase in flexibility with regard to the geometry of producible profiles is small.

SUMMARY

Against this background, it is the object of the disclosure to increase the flexibility in the automated production of preforms from fiber-reinforced plastic.

Said problem is solved, in the case of an apparatus for the production of preforms from fiber-reinforced plastic having features described herein. Likewise, the problem is solved, in the case of a method for the production of preforms from fiber-reinforced plastic having features described herein.

What is essential to some embodiments disclosed herein is the realization that, by way of an adjustment of the component that effects the deformation of the cross section to form the nominal profile, said nominal profile can be adapted in terms of its cross section. In this way, variability of the transverse deformation is made possible, which variability is realized without cumbersome conversion of said component or even of the entire production apparatus.

In an embodiment, such an adjustment may also be performed during the feed, and thus, as it were, "online".

In this way, it is also possible to realize a variable nominal profile on a single preform.

In some embodiments, the above variation of the nominal profile may relate in particular to a web height of the nominal profile.

Various embodiments relate to a draping apparatus having a mold core composed of two mold core parts which are adjustable by way of a relative pivoting movement and in the case of which the nominal profile can be defined or varied by way of said pivoting.

Some embodiments include various advantageous refinements of roller arrangements of the draping apparatus, by way of which the transverse deformation can be promoted.

An embodiment provides an apparatus for the production of preforms from fiber-reinforced plastic, having a feed arrangement for the continuous feed of a laid fiber fabric and having a transverse deformation arrangement with a draping apparatus for the deformation of the fed laid fiber fabric to form a predefined nominal profile, wherein the draping apparatus is adjustable for a variation of a cross section of the nominal profile.

In an embodiment, the draping apparatus is adjustable during a feed of the laid fiber fabric to the draping apparatus.

In an embodiment, the transverse deformation arrangement has an electronic control arrangement for the adjustment of the draping apparatus.

In an embodiment, the apparatus comprises a heating arrangement which is positioned upstream of the transverse deformation arrangement in terms of the feed movement and which serves for the activation of the laid fiber fabric, such that the laid fiber fabric that has been deformed to form the nominal profile is stabilized.

In an embodiment, the draping apparatus is adjustable for the variation of a web, in particular of a web height, of the nominal profile.

In an embodiment, the draping apparatus has a mold core with a first mold core part, such as for producing a first flange of the nominal profile, and a second mold core part, such as for the production of a second flange of the nominal profile, and wherein, for the variation of the nominal profile, the first mold core part and the second mold core part are adjustable relative to one another, in particular wherein, for the variation of the web of the nominal profile, the first mold core part and the second mold core part are adjustable relative to one another.

In an embodiment, the first mold core part and/or the second mold core part has a respective flank for the production of the first flange and of the second flange respectively, wherein, in a feed direction, the respective flank rises in ramp-like fashion out of a horizontal plane of the first mold core part or of the second mold core part respectively.

In an embodiment, the transverse deformation arrangement has a frame for receiving the draping apparatus, wherein the first mold core part is rigidly connected to the frame.

In an embodiment, the first mold core part and the second mold core part are pivotable relative to one another, such as by way of a pivoting connection, wherein the second mold core part is connected by way of the pivoting connection to the frame, in particular wherein the mold core is of elongate form and the pivoting connection is arranged at one longitudinal end of the mold core.

In an embodiment, the draping apparatus has a linear drive for the adjustment of the first mold core part and of the second mold core part relative to one another, wherein the linear drive imparts an action, for adjustment purposes, at a distance from the pivoting connection.

In an embodiment, the draping apparatus has a first roller arrangement for the cross-sectional fixing of the laid fiber fabric, wherein the draping apparatus has a second roller arrangement for the cross-sectional fixing of the laid fiber fabric.

In an embodiment, the first roller arrangement comprises convex rollers, such as for the production of the first flange, furthermore wherein the first roller arrangement is arranged above the first mold core part and is rigidly connected to the frame, in particular wherein the first roller arrangement, in terms of its orientation, follows the ramp-like rise of the flank of the first mold core part.

In an embodiment, the second roller arrangement comprises concave rollers, such as for the production of the second flange, furthermore wherein the second roller arrangement is arranged above the second mold core part and is rigidly connected to the second mold core part, in particular wherein the second roller arrangement follows the ramp-like rise of the flank of the second mold core part.

In an embodiment, the draping apparatus has a smoothing arrangement, and can comprise horizontal guide rollers, for smoothing the fed laid fiber fabric, in particular in the region of the web.

An embodiment provides a method for the production of preforms from fiber-reinforced plastic, wherein a laid fiber fabric is fed continuously to a draping apparatus for the deformation of the laid fiber fabric to form a predefined nominal profile, wherein the draping apparatus is adjusted for the variation of a cross section of the nominal profile.

BRIEF DESCRIPTION OF THE FIGURES

Further details, features, aims and advantages of the present disclosure will be discussed in more detail below on the basis of a drawing, which illustrates merely one exemplary embodiment. In the drawing.

DETAILED DESCRIPTION

Figure 1:
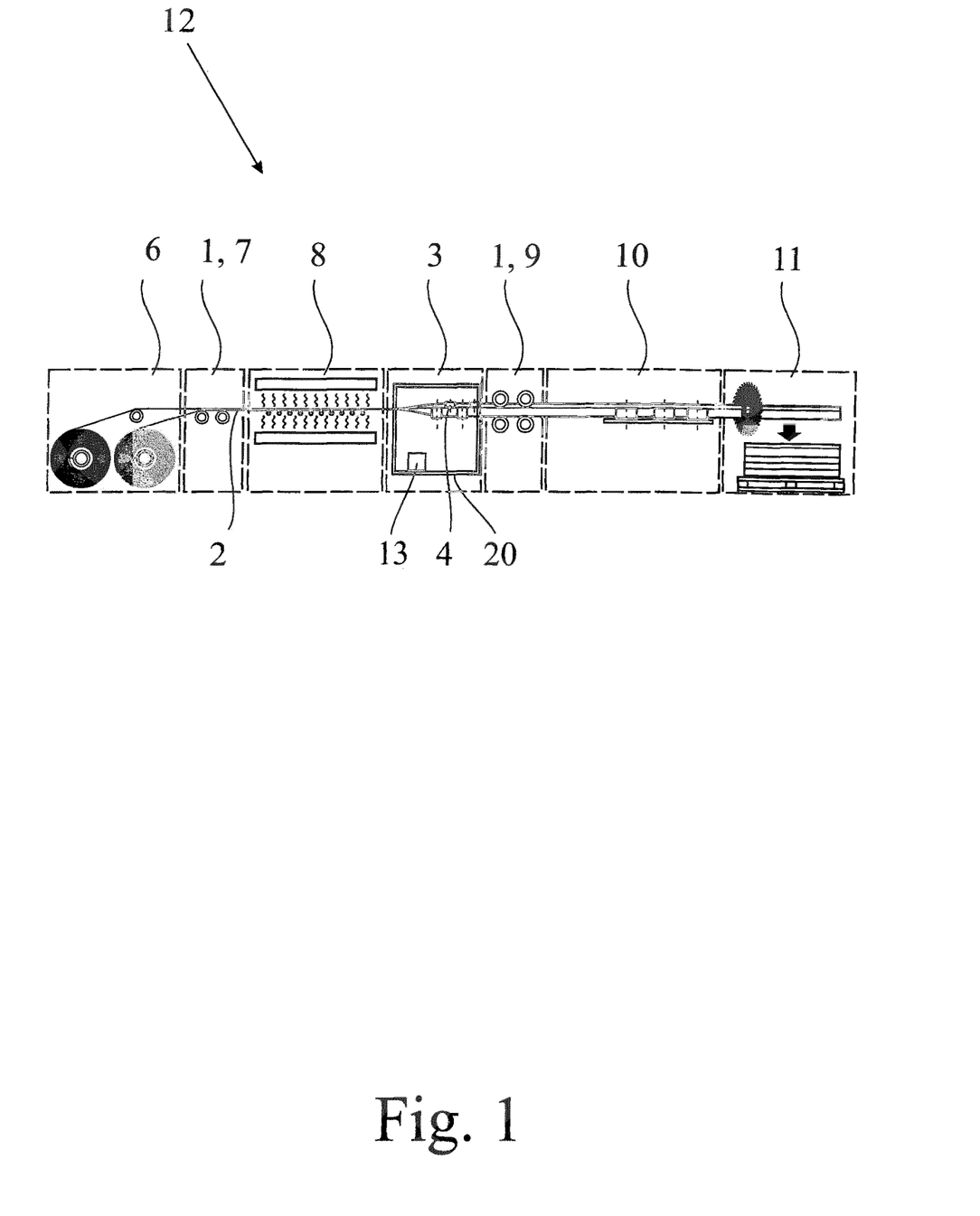
FIG. 1 shows a schematic side view of an exemplary embodiment of a proposed apparatus for the production of preforms with a transverse deformation arrangement, FIGS. 2*a*, *b* show in each case a perspective view of a mold core of the draping apparatus of the transverse deformation arrangement from FIG. 1 with different adjustments.

FIG. 1 shows an exemplary embodiment of a proposed apparatus for the production of fiber-reinforced plastic. The proposed apparatus has a feed arrangement 1 for the continuous feed of a laid fiber fabric 2. The laid fiber fabric 2 is in the present case a fiber material bound using a thermoplastic powder, and is thus a fiber matrix semifinished part, also referred to as prepreg.

The proposed apparatus likewise has a transverse deformation arrangement 3 with a draping apparatus 4 for the deformation of the fed laid fiber fabric 2 to form a predefined nominal profile 5. Two such nominal profiles 5 with a different cross section in each case are illustrated in FIGS. 5*a*, *b*. Further processing steps may additionally also be performed in the transverse deformation arrangement 3.

The proposed apparatus is now distinguished by the fact that the draping apparatus 4 is adjustable for a variation of a cross section of the nominal profile 5. Said adjustability of the draping apparatus 4 may in this case comprise both an adjustment of the draping apparatus 4 relative to a separate structure of the transverse deformation arrangement 3 and an adjustment of constituent parts of the draping apparatus 4 relative to one another—that is to say, as it were, an internal adjustment. It is merely necessary that an adjustment is possible which leads to a variation of a cross section of the nominal profile 5 formed by the draping apparatus 4 by deformation of the fed laid fiber fabric 2.

Referring to FIG. 1, the apparatus according to the exemplary embodiment will be briefly described as a whole. At the start in the conveying and processing direction, the apparatus has a material store 6 which provides the laid fiber fabric 2 from supply rolls. Said material supply 6 is adjoined by a guide arrangement 7, and the latter in turn is adjoined by a heating arrangement 8. This is then followed by the transverse deformation arrangement 3 already mentioned above. This is then followed in the conveying direction by a conveying drive arrangement 9, by means of which the laid fiber fabric 2 is pulled from the material store 6 and is correspondingly conveyed onward. In the present exemplary embodiment, it is possible for both the guide arrangement 7 and the conveying drive arrangement 9 to be understood to be constituent parts of the feed arrangement 1. These are finally followed by a longitudinal deformation arrangement 10 and a cutting arrangement 11 for the longitudinal cutting of the preforms. Here, the described apparatus forms one strand 12. Apparatuses are also conceivable which have multiple such strands 12, wherein said strands are generally arranged one above the other. Each individual strand 12 serves here for the production of an—in each case different—individual profile, wherein the various individual profiles can then be connected to form one overall profile.

Figure 2:
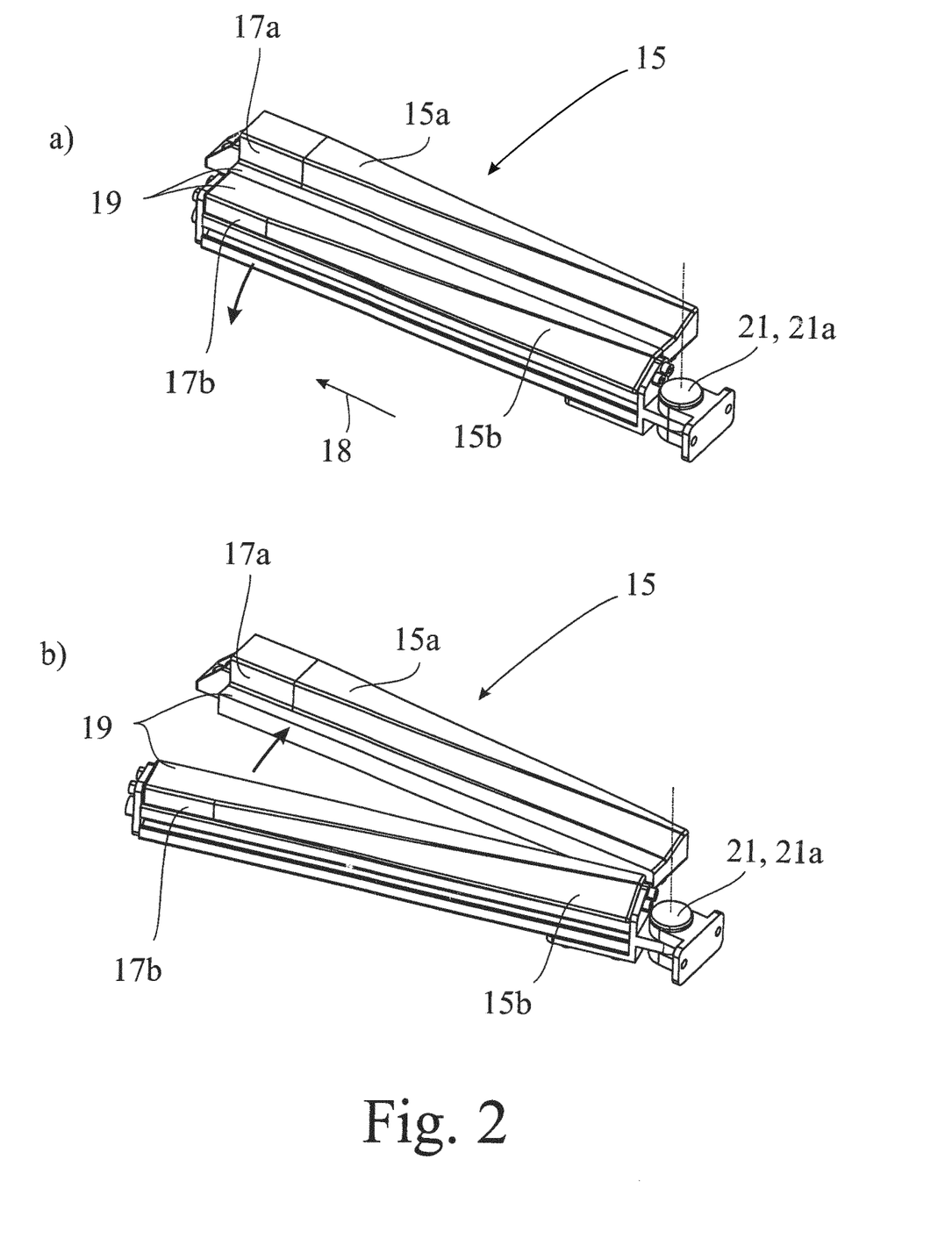

Major constituent parts of the draping apparatus 4 of the proposed apparatus are illustrated in FIGS. 2*a*, *b* and 3 and 4, which will be referred to below.

It is possible for the draping apparatus 4 to be adjustable during a feed of the laid fiber fabric 2 to the draping apparatus 4, in some embodiments. This may also be referred to as "online" adjustability. This permits not only a rapid changeover from one nominal profile 5 to another, for example from the nominal profile 5 of FIG. 5*a* to that of FIG. 5*b*, but also the provision of nominal profiles 5 with a different cross section on one and the same preform. It is thus possible to produce preforms with different cross sections in regions.

For such an adjustment during the feed, an electronic controller is particularly expedient. It is therefore possible for the transverse deformation arrangement 2 to have an electronic control arrangement 13 for the adjustment of the draping apparatus 4, in some embodiments. Said electronic control arrangement 13 may also be formed by a central processing unit which performs all of the control tasks for the proposed apparatus or for multiple such apparatuses.

It is likewise possible, in some embodiments, for the apparatus to comprise a heating arrangement 8 which is positioned upstream of the transverse deformation arrangement 4 in terms of the feed movement and which serves for the activation of the laid fiber fabric 2, such that the laid fiber fabric 2 that has been deformed to form the nominal profile 5 is stabilized. The heating arrangement 8, which has already been mentioned above, thus serves for the activation of the binding arrangement, such that the process of deformation of the laid fiber fabric 2 is associated with fixing of the shape that is then realized.

The draping apparatus 4 can be adjustable for the variation of a web 14 and here in particular for the variation of a web height 14a of the nominal profile 5. A corresponding variation of the web 14 or of the web height 14a is illustrated in FIGS. 5a and 5b.

Figure 3:
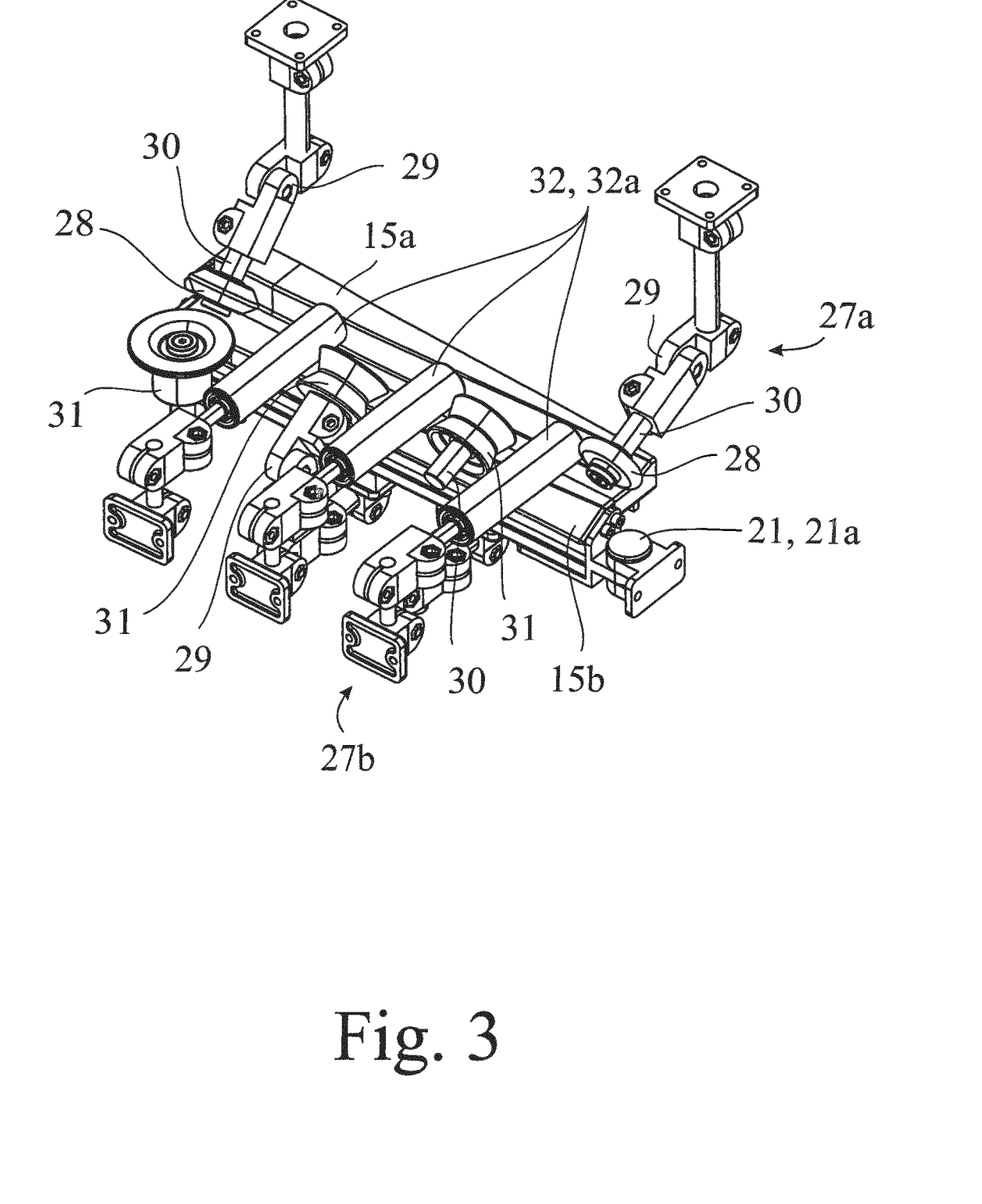
FIG. 3 shows a perspective view of the mold core of FIGS. 2*a*, *b* with associated rollers of the draping apparatus.

In various embodiments, it is possible, as illustrated in FIGS. 2a, b and 3, for the draping apparatus 4 to have a mold core 15 with a first mold core part 15a and a second mold core part 15b, wherein, for the variation of the nominal profile 5, the first mold core part 15a and the second mold core part 15b are adjustable relative to one another. Such an adjustment may for example correspond to the transition from the relative position of the mold core parts 15a, b as per FIG. 2a to the relative position of the mold core parts 15a, b as per FIG. 2b. It is also basically possible for the mold core 15 to have further, likewise mutually adjustable mold core parts. The laid fiber fabric 2 is thus draped over the mold core 15 and, in the process, assumes a cross section which is defined by the mold core 15.

FIGS. 2a, b illustrate the embodiment, in which, for the variation of the web 14 of the nominal profile 5, the first mold core part 15a and the second mold core part 15b are adjustable relative to one another. Specifically, the web height 14a is in this case defined by the extent to which the first mold core part 15a is adjusted away from the second mold core part 15b.

Figure 5:
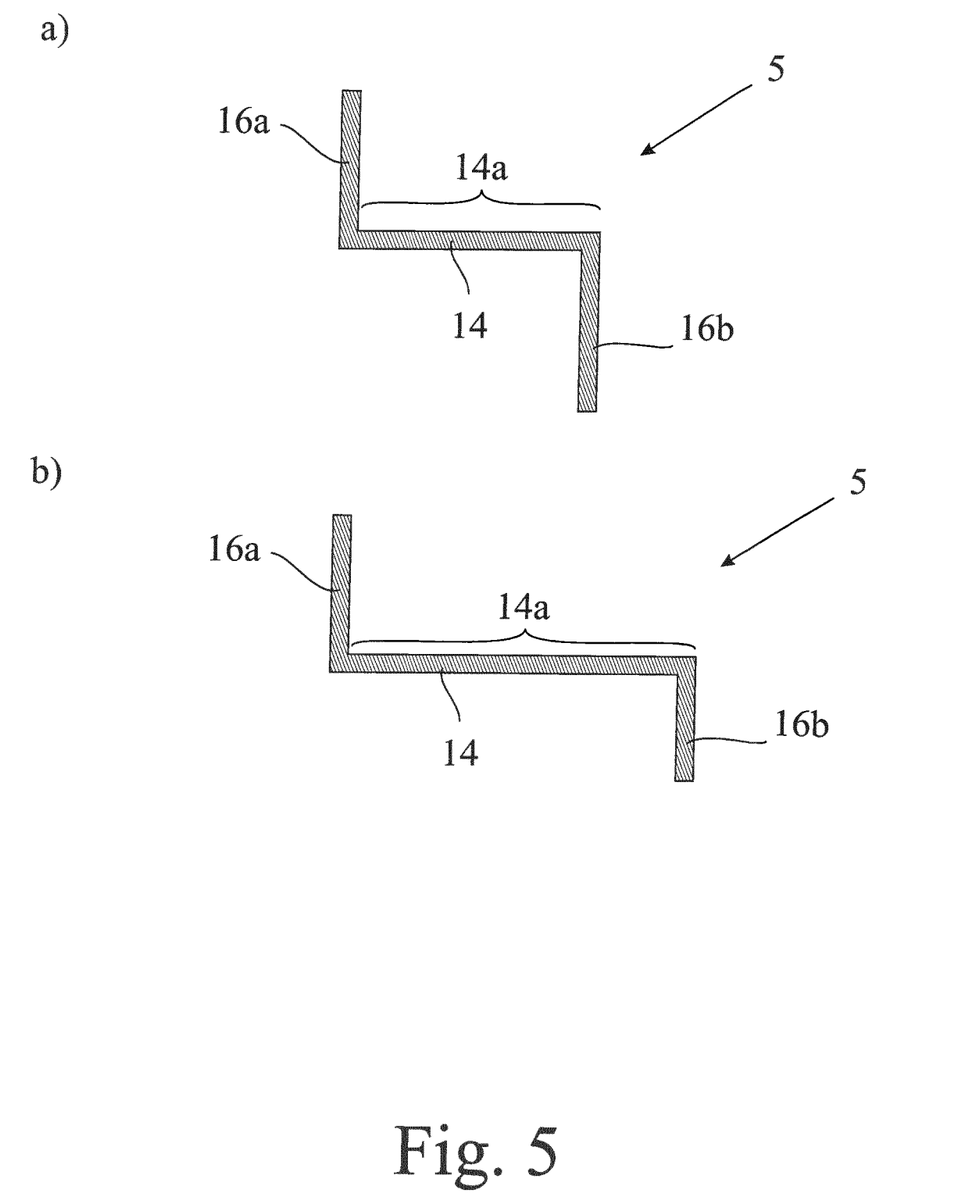

Viewing FIGS. 2a, 2b and 5 together, it can be seen that the first mold core part 15a can be configured for the production of a first flange 16a of the nominal profile 5, and alternatively or additionally, the second mold core part 15b is designed for the production of a second flange 16b of the nominal profile 5. This can be achieved in that the first mold core part 15a and/or the second mold core part 15b has a respective flank 17a, b for the production of the first flange 16a and of the second flange 16b respectively. The flanges 16a, b are thus formed by virtue of the laid fiber fabric 2 being draped over the respective flanks 17a, b.

To make it possible to realize as load-free a transition as possible proceeding from the generally planar cross section of the laid fiber fabric 2 in the form in which it is fed to the transverse deformation arrangement 4, it can be the case that, in a feed direction 18, the respective flank 17a, b rises in ramp-like fashion out of a horizontal plane 19 of the first mold core part 15a or of the second mold core part 15b respectively. This can be seen in FIGS. 2a, b. Here, the horizontal plane 19 corresponds to that section of the mold core 15 over which that part of the laid fiber fabric 2 which corresponds to the web 14 is draped.

In order to be able to adequately support the draping apparatus 4, it can be provided that the transverse deformation arrangement 4 has a frame 20 for receiving the draping apparatus 4. Said frame 20 may in particular be fixed so as to be positionally static. It can also be the case that the first mold core part 15a is rigidly connected to the frame 20. It is thus sufficient for only one mold core part of the mold core 15 to be movable.

With regard to said movement of the mold core parts 15a, b, it can be provided that the first mold core part 15a and the second mold core part 15b are pivotable relative to one another. FIGS. 2a and 2b illustrate such a scissor-like pivoting movement. It can be the case that the first mold core part 15a and the second mold core part 15b are pivotable relative to one another by way of a pivoting connection 21. Here, it is not necessary for said pivoting connection 21 to exist between the mold core parts 15a, b. It can be, as per the illustration in FIGS. 2a, b, for the second mold core part 15b to be connected by way of the pivoting connection 21, which is in this case a hinge-fork connection 21a, to the frame 20. If, as in a variant, the mold core 15 is of elongate form, the pivoting connection 21 may be arranged at one longitudinal end of the mold core 15.

Figure 4:
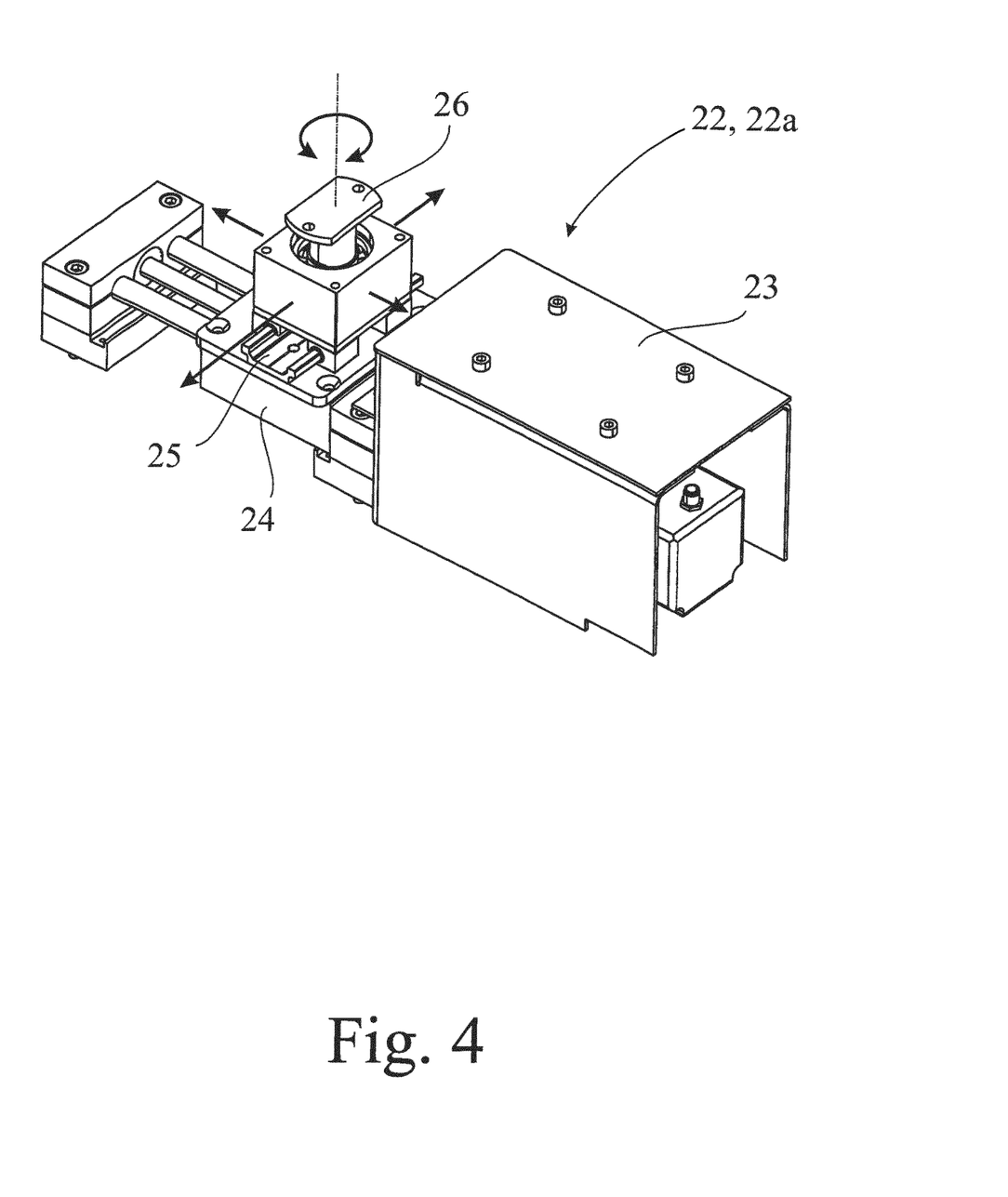
FIG. 4 shows a perspective view of a linear drive of the transverse deformation arrangement from FIG. 1 for the adjustment of the mold core from FIGS. 2*a*, *b*, and FIGS. 5*a*, *b* show two nominal profiles of a preform with different cross section in each case, wherein the preform has been produced by way of the proposed apparatus of FIG. 1.

To effect the proposed adjustment, the draping apparatus 4 can have a linear drive 22 for the adjustment of the first mold core part 15a and of the second mold core part 15b relative to one another. A linear drive 22 of said type, which in the present case is a stepper motor 22a, is illustrated in FIG. 4. For a good lever action, the linear drive 22 can impart an action, for adjustment purposes, at a distance from the pivoting connection 21. For shielding with respect to the heat generated for example by the heating arrangement 8, the linear drive can have a heat shield 23. Here, the linear drive 22 drives an active linear unit 24 along a linear path.

In the present exemplary embodiment, the linear drive 22 drives the second mold core part 15b. In accordance with the above pivoting connection 21, the second mold core part 15b performs a circular movement. For the compensation of the respective movement paths, the linear drive 22 also has a passive linear unit 25 and a mounted guide shaft 26 between the active linear unit 24 and the second mold core part 15b.

In order that the laid fiber fabric 2 can be draped as accurately as possible onto the mold core 15 and the laid fiber fabric 2 can be correspondingly deflected, it can be the case that the draping apparatus 4 has a first roller arrangement 27a for the cross-sectional fixing of the laid fiber fabric 2. Furthermore, the draping apparatus 4 may have a second roller arrangement 27b for the cross-sectional fixing of the laid fiber fabric 2. This substantive matter is illustrated in FIG. 3.

Here, it can be provided that the first roller arrangement 27a comprises convex rollers 28, which may serve in particular for the production of the first flange 16a, specifically by virtue of the laid fiber fabric 2 being guided on the corresponding flank 17a. Here, as per FIG. 3, the first roller arrangement 27a is arranged above the first mold core part 15a and—like the latter—is rigidly connected to the frame 20, specifically in the present case by way of clamping connectors 29. To realize low friction between the convex rollers 28 and the laid fiber fabric 2, it is also the case that plain bearing adapters 30 are provided between the convex rollers 28 and the clamping connectors 29. In an embodiment that can be seen from FIG. 3, the first roller arrangement 27a, in terms of its orientation, follows the ramp-like rise of the flank 17a of the first mold core part 15a.

A corresponding embodiment of the second roller arrangement 27b provides that said second roller arrangement comprises concave rollers 31. These can serve for the production of the second flange 16b, wherein it is furthermore possible, in some embodiments, for said second roller arrangement 27b to be arranged above the second mold core part 15b and to be rigidly connected to the second mold core part 15b. In this way, the second roller arrangement 27b can follow a movement of the second mold core part 15b. The connection to the second mold core part 15b is likewise realized by way of clamping connectors 29, thus permitting a variable adjustment of the concave rollers 31. It is also the case for the second roller arrangement 27b that plain bearing adapters 30 can be provided for reducing the friction. It is also possible, in some embodiments, for the second roller arrangement 27b to follow the ramp-like rise of the flank 17b of the second mold core part 15b, as can likewise be seen from FIG. 3.

Aside from these roller arrangements 27a, b described above, which are intended to promote precise formation of the desired cross section, it can be possible for the draping apparatus 4 to have a smoothing arrangement 32 for the smoothing of the supplied laid fiber fabric 2, which smoothing arrangement 32 can have horizontal guide rollers 32a. It is thus sought in this way to prevent the formation of undulations or the like. Therefore, the smoothing arrangement 32 can be arranged in the region of the web 14.

In the case of a proposed method for the production of preforms from fiber-reinforced plastic, a laid fiber fabric 2 is fed continuously to a draping apparatus 4 for the deformation of the laid fiber fabric to form a predefined nominal profile 5.

The proposed method is distinguished by the fact that the draping apparatus 4 is adjusted for the variation of a cross section of the nominal profile 5.

Various embodiments of the proposed method emerge from the above embodiments of the proposed apparatus.

The invention claimed is:

1. An apparatus for the production of preforms from fiber-reinforced plastic, comprising:
    a feed arrangement for the continuous feed of a fiber fabric, and
    a transverse deformation arrangement with a draping apparatus for the deformation of the fed fiber fabric to form a predefined nominal profile,
    wherein the draping apparatus comprises a mold core and a first roller arrangement, for the cross-sectional fixing of the fiber fabric,
    wherein the first roller arrangement comprises a roller,
    wherein the draping apparatus is configured to receive the fiber fabric draped on the mold core and the draping apparatus is adjustable for a variation of a cross section of the nominal profile,
    wherein the mold core comprises a first mold core part and a second mold core part,
    wherein, for the variation of the nominal profile, the first mold core part and the second mold core part are adjustable relative to one another, and
    wherein the mold core and the first roller arrangement are configured such that the fiber fabric travels between the mold core and the first roller arrangement.

2. The apparatus as claimed in claim 1, wherein the draping apparatus is adjustable during a feed of the fiber fabric to the draping apparatus.

3. The apparatus as claimed in claim 1, wherein the transverse deformation arrangement has an electronic control arrangement for the adjustment of the draping apparatus.

4. The apparatus as claimed in claim 1, wherein the apparatus comprises a heating arrangement which is positioned upstream of the transverse deformation arrangement in terms of the feed movement and which serves for the activation of the fiber fabric, such that the fiber fabric that has been deformed to form the nominal profile is stabilized.

5. The apparatus as claimed in claim 1, wherein the draping apparatus is adjustable for the variation of a web.

6. The apparatus as claimed in claim 1, wherein the first mold core part and/or the second mold core part has a respective flank for the production of a first flange and of a second flange respectively.

7. The apparatus as claimed in claim 6, wherein in a feed direction, the respective flank rises in ramp-like fashion out of a horizontal plane of the first mold core part or of the second mold core part respectively.

8. The apparatus as claimed in claim 1, wherein the transverse deformation arrangement has a frame for receiving the draping apparatus.

9. The apparatus as claimed in claim 8, wherein the first mold core part and the second mold core part are pivotable relative to one another.

10. The apparatus as claimed in claim 9, wherein the second mold core part is connected by way of a pivoting connection to the frame.

11. The apparatus as claimed in claim 8, wherein the draping apparatus has a linear drive for the adjustment of the first mold core part and of the second mold core part relative to one another.

12. The apparatus as claimed in claim 11, wherein the linear drive imparts an action, for adjustment purposes, at a distance from a pivoting connection between the second mold core part and the frame.

13. The apparatus as claimed in claim 8, wherein the first mold core part is rigidly connected to the frame.

14. The apparatus as claimed in claim 1, wherein the first roller arrangement comprises convex rollers.

15. The apparatus as claimed in claim 1, wherein the draping apparatus has a smoothing arrangement configured to smooth the fed fiber fabric.

16. The apparatus as claimed in claim 1, wherein the draping apparatus has a second roller arrangement for the cross-sectional fixing of the fiber fabric.

17. The apparatus as claimed in claim 16, wherein the second roller arrangement comprises concave rollers.

* * * * *